US012743981B2

(12) United States Patent
An et al.

(10) Patent No.: US 12,743,981 B2
(45) Date of Patent: Sep. 22, 2026

(54) DISPLAY DEVICE AND ELECTRONIC DEVICE INCLUDING THE SAME

(71) Applicant: Samsung Display Co., Ltd., Yongin-Si (KR)

(72) Inventors: Byoung Kwan An, Yongin-si (KR); Seok Gyu Ban, Yongin-si (KR); Nam Jae Lim, Yongin-si (KR); Joon Hyeok Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/963,850

(22) Filed: Nov. 29, 2024

(65) Prior Publication Data

US 2025/0391305 A1 Dec. 25, 2025

(30) Foreign Application Priority Data

Jun. 20, 2024 (KR) ........................ 10-2024-0080398

(51) Int. Cl.
*G09G 3/20* (2006.01)
*G09G 3/3233* (2016.01)

(52) U.S. Cl.
CPC ......... *G09G 3/2007* (2013.01); *G09G 3/2092* (2013.01); *G09G 3/3233* (2013.01); *G09G 2300/0842* (2013.01); *G09G 2320/0233* (2013.01); *G09G 2320/0257* (2013.01); *G09G 2320/045* (2013.01); *G09G 2320/048* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,262,582 | B2 | 4/2019 | Han | |
| 11,605,331 | B2 | 3/2023 | Pyun et al. | |
| 11,610,548 | B2 | 3/2023 | Xu et al. | |
| 11,682,328 | B2 | 6/2023 | Yoo | |
| 2015/0243211 | A1 | 8/2015 | Pyo | |
| 2020/0111455 | A1 * | 4/2020 | Lee | G09G 5/373 |
| 2022/0319439 | A1 * | 10/2022 | Pyun | G09G 3/3233 |

FOREIGN PATENT DOCUMENTS

| | | | |
|---|---|---|---|
| KR | 10-2017-0088452 | A | 8/2017 |
| KR | 10-2020-0079695 | A | 7/2020 |
| KR | 10-2205798 | B1 | 1/2021 |
| KR | 10-2022-0134806 | A | 10/2022 |
| KR | 10-2023-0016131 | A | 2/2023 |

* cited by examiner

*Primary Examiner* — Ifedayo B Iluyomade
(74) *Attorney, Agent, or Firm* — Innovation Counsel LLP

(57) ABSTRACT

A display device includes a pixel emitting light based on input image data, an age data calculator configured to generate age data of a light emitting element included in the pixel in consideration of a power voltage supplied to the pixel, and a compensator configured to output age compensation data by determining a grayscale compensation value corresponding to an input grayscale of the input image data, based on the age data, and applying the grayscale compensation value to the input image data.

21 Claims, 10 Drawing Sheets

DISPLAY DEVICE AND ELECTRONIC DEVICE INCLUDING THE SAME

This application claims priority to Korean Patent Application No. 10-2024-0080398, filed on Jun. 20, 2024, and all the benefits accruing therefrom under 35 U.S.C. § 119, the content of which in its entirety is herein incorporated by reference.

BACKGROUND

1. Field

The disclosure relates to a display device and an electronic device including the same.

2. Description of the Related Art

Recently, interest in an information display is increasing. Accordingly, research and development on a display device is continuously being conducted.

The display device includes a plurality of pixels connected to a plurality of data lines and a plurality of scan lines. Each of the plurality of pixels includes a pixel circuit and a light emitting element. The light emitting element emits light with a predetermined luminance corresponding to a driving current supplied from a driving transistor through the pixel circuit. The display device (particularly, an organic light emitting display device) accumulates age (for example, stress or a degradation degree) for each pixel by using image sticking compensation technology, and compensates for the stress for each pixel based on the accumulated age to remove image sticking. For example, the stress may be accumulated based on a current flowing through each of sub-pixels for each frame, an emission time of each of the sub-pixels, a temperature of a display panel, and the like.

SUMMARY

An embodiment of the disclosure provides a display device and an electronic device including the same capable of achieving higher image quality by performing an image sticking compensation operation by accurately reflecting age of a light emitting element.

According to an embodiment of the disclosure, a display device includes a pixel emitting light based on input image data, an age data calculator configured to generate age data of a light emitting element included in the pixel in consideration of a power voltage supplied to the pixel, and a compensator configured to output age compensation data by determining a grayscale compensation value corresponding to an input grayscale of the input image data, based on the age data, and applying the grayscale compensation value to the input image data.

In an embodiment, the age data calculator may include a degradation calculator calculating degradation data based on the age compensation data, an adjustor adjusting the degradation data based on the power voltage and calculating adjusted degradation data, and an accumulator generating the age data by accumulating the adjusted degradation data.

In an embodiment, the degradation calculator may calculate the degradation data using a formula:

$STDATA=K\times(LR)^{LAC}$, where, K is a positive real number, LAC is a luminance acceleration coefficient of the light emitting element, and LR is a luminance ratio determined by the age compensation data.

In an embodiment, the degradation calculator may calculate the luminance ratio using a formula:

$$LR=\left(\frac{ACDATA}{255}\right)^{\gamma},$$

where, ACDATA may be the age compensation data, and $\gamma$ may be a gamma value.

In an embodiment, the adjustor may include a calculator generating a memory control signal (MCTR) based on the power voltage, and a LUT memory transmitting a correction value corresponding to the power voltage to the calculator in response to the memory control signal. The calculator may calculate the adjusted degradation data using the degradation data and the correction value.

In an embodiment, the LUT memory may store a lookup table including a plurality of correction values respectively corresponding to a plurality of power voltages.

In an embodiment, the calculator may calculate the adjusted degradation data using a formula: $A\_STDATA=ROUND\{STDATA\times(ICH)^{IAC}, 0\}$, where, A_STDATA may be the adjusted degradation data, ICH may be the correction value, and IAC may be a current acceleration coefficient of the light emitting element.

In an embodiment, the adjustor may include a calculator generating a memory control signal (MCTR) based on the power voltage and the age compensation data, and a LUT memory transmitting a correction value corresponding to the power voltage to the calculator in response to the memory control signal. The calculator may calculate the adjusted degradation data using the degradation data and the correction value.

In an embodiment, the display device may further include a grayscale scaler configured to generate a scaled grayscale in which the input grayscale is scaled based on a scaling ratio corresponding to the age data in order to prevent the grayscale compensation value from being saturated due to accumulation of the degradation data.

In an embodiment, the compensator may include a memory including a plurality of lookup tables in which a plurality of preset age values corresponding to the age data and compensation values respectively corresponding to display grayscales that may be implemented by a display panel are set, a compensation value determiner determining the grayscale compensation value corresponding to the age data and the scaled grayscale using the plurality of lookup tables, and a compensation data output unit outputting the age compensation data by applying the grayscale compensation value to the scaled grayscale data.

According to another embodiment of the disclosure, a display device may include a display panel including a plurality of pixels, an image sticking compensator configured to output age compensation data based on age data and an input grayscale of input image data, a scan driver configured to provide a plurality of scan signals to the display panel, a data driver configured to provide a plurality of data signals corresponding to the age compensation data to the display panel, a power voltage generator configured to generate a power voltage supplied to the pixel, and a timing controller configured to control driving of the scan driver, the data driver, and the power voltage generator. The image sticking compensator may include an age data calculator configured to generate the age data according to the power voltage supplied to the plurality of pixels, and a compensator configured to output the age compensation data by determining a grayscale compensation value corresponding to the input grayscale of the input image data, based on the age data, and applying the grayscale compensation value to the input image data.

In an embodiment, the timing controller may generate a voltage control signal that controls the power voltage generator to change the power voltage. The age data calculator may include a degradation calculator calculating degradation data based on the age compensation data, an adjustor adjusting the degradation data in response to the voltage control signal and calculating adjusted degradation data, and an accumulator generating the age data by accumulating the adjusted degradation data.

In an embodiment, the degradation calculator may calculate the degradation data using a formula: $STDATA=K\times(LR)^{LAC}$, where, K may be a positive real number, LAC may be a luminance acceleration coefficient of a light emitting element, and LR may be a luminance ratio determined by the age compensation data.

In an embodiment, the degradation calculator may calculate the luminance ratio using a formula:

$$LR=\left(\frac{ACDATA}{255}\right)^{\gamma},$$

where, ACDATA may be the age compensation data, and $\gamma$ may be a gamma value.

In an embodiment, the adjustor may include a calculator generating a memory control signal (MCTR) in response to the power voltage, and a LUT memory transmitting a correction value corresponding to the power voltage to the calculator in response to the memory control signal. The calculator may calculate the adjusted degradation data using the degradation data and the correction value.

In an embodiment, the LUT memory may store a lookup table including a plurality of correction values respectively corresponding to a plurality of power voltages.

In an embodiment, the calculator may calculate the adjusted degradation data using a formula: $A\_STDATA=ROUND\{STDATA\times(ICH)^{IAC},\ 0\}$, where, A_STDATA may be the adjusted degradation data, ICH may be the correction value, and IAC may be a current acceleration coefficient of the light emitting element.

In an embodiment, the adjustor may include a calculator generating a memory control signal (MCTR) based on the power voltage and the age compensation data, and a LUT memory transmitting a correction value corresponding to the power voltage to the calculator, based on the memory control signal. The calculator may calculate the adjusted degradation data from the degradation data based on the correction value.

In an embodiment, the display device may further include a grayscale scaler configured to generate a grayscale in which the input grayscale is scaled based on a scaling ratio corresponding to the age data in order to prevent the grayscale compensation value from being saturated due to accumulation of the degradation data.

In an embodiment, the compensator may include a memory including a plurality of lookup tables in which a plurality of preset age values corresponding to the age data and compensation values respectively corresponding to display grayscales that may be implemented by a display panel are set, a compensation value determiner determining the grayscale compensation value corresponding to the age data and the scaled grayscale using the plurality of lookup tables, and a compensation data output unit outputting the age compensation data by applying the grayscale compensation value to the scaled grayscale data.

According to still another embodiment of the disclosure, an electronic device includes a display panel including a plurality of pixels, a data conversion circuit configured to output age compensation data based on age data and an input grayscale of input image data, a scan driver configured to provide a plurality of scan signals to the display panel, a data driver configured to provide a plurality of data signals corresponding to the age compensation data to the display panel, a power module configured to generate a power voltage supplied to the pixel, and a controller configured to control driving of the scan driver, the data driver, and the power module. The data conversion circuit includes an age data calculator configured to generate the age data according to the power voltage supplied to the plurality of pixels, and a compensator configured to output the age compensation data by determining a grayscale compensation value corresponding to the input grayscale of the input image data, based on the age data, and applying the grayscale compensation value to the input image data.

According to a display device and an electronic device including the same according to embodiments of the disclosure, by performing an image sticking compensation operation by accurately reflecting age of a light emitting element, higher image quality may be achieved.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
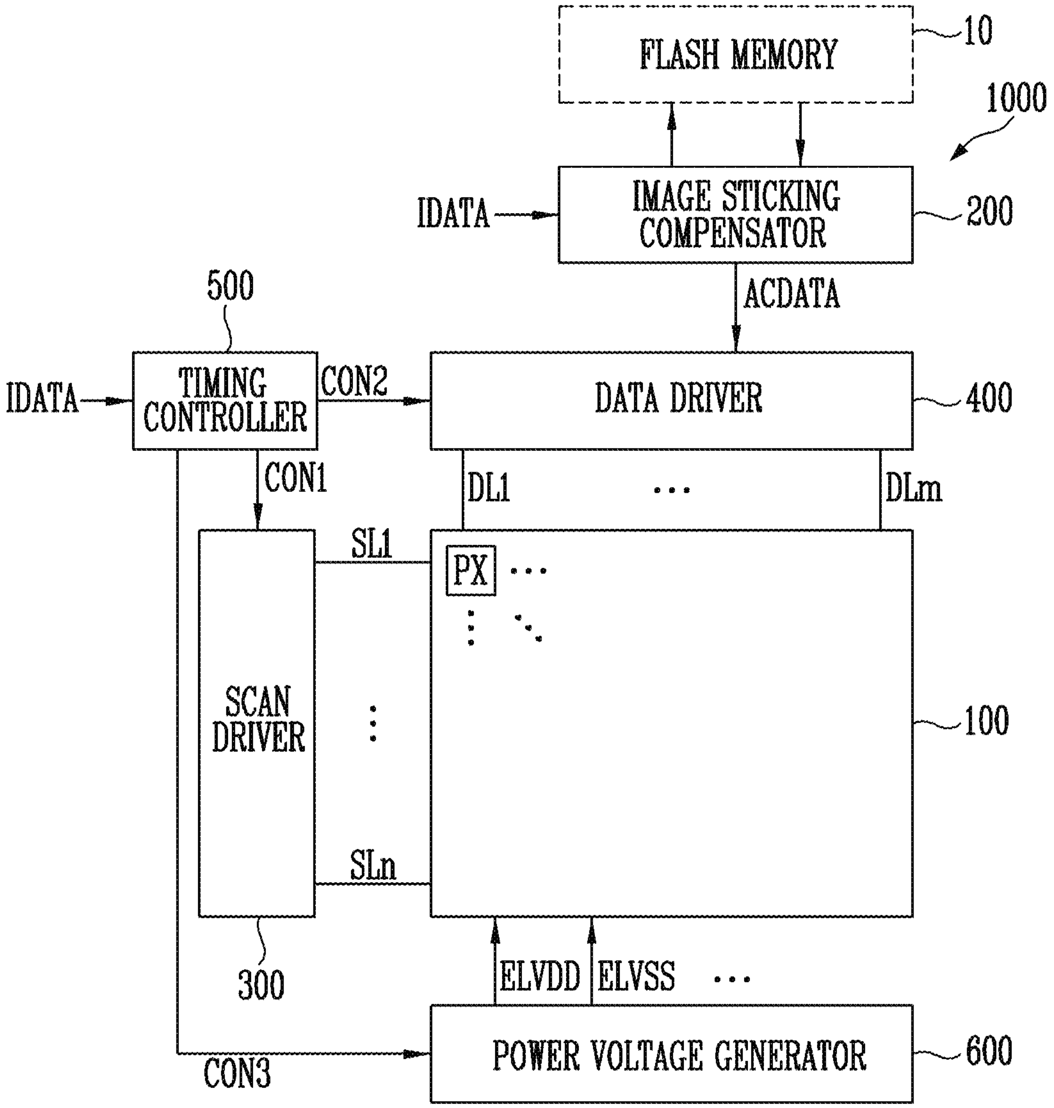
FIG. 1 is a block diagram illustrating a display device according to an embodiment of the disclosure.

The disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

It should be understood that in the present application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interactive individual blocks, units, and/or modules without departing from the scope of the inventive concept. In addition, in some embodiments, the block, unit and/or module may be physically combined into more complex blocks, units, and/or modules without departing from the scope of the inventive concept.

Hereinafter, a display device according to an embodiment of the disclosure is described with reference to drawings related to embodiments of the disclosure.

FIG. 1 is a block diagram illustrating a display device according to an embodiment of the disclosure.

Referring to FIG. 1, the display device 1000 may include a display panel 100, an image sticking compensator 200, a scan driver 300, a data driver 400, a timing controller 500, and a power voltage generator 600.

The display device 1000 may include an organic light emitting display device, a liquid crystal display device, or the like. In addition, the display device 1000 may include a flexible display device, a rollable display device, a curved display device, a transparent display device, a mirror display device, or the like implemented in the organic light emitting display device or the like.

The display panel 100 may include a plurality of pixels PX and may display an image. Specifically, the display panel 100 may include the pixels PX formed at a position corresponding to intersections of a plurality of scan lines SL1 to SLn and a plurality of data lines DL1 to DLm. In an embodiment, the display panel 100 may provide degradation information (or age information) of the pixels generated through pixel sensing or the like to the image sticking compensator 200. The degradation information may include an emission time, a grayscale, a luminance, a temperature, and the like of the pixels. The degradation information may be generated in a pixel block unit including an individual pixel or grouped pixels. In an embodiment, the pixels PX may refer to a sub-pixel, and may each emit light of one of red, green, and blue.

The image sticking compensator 200 may output age compensation data ACDATA based on age data A_DATA and an input grayscale IGRAY1 of input image data IDATA. That is, the image sticking compensator 200 may individually determine a compensation value according to a grayscale that is required to be displayed by the pixel PX. In an embodiment, the image sticking compensator 200 may include a degradation calculator 250 calculating a degradation weight based on the input image data IDATA and calculating degradation data of one frame, an accumulator 240 generating the age data, in which the degradation data is accumulated by accumulating the degradation data, a grayscale scaler 210 generating a grayscale in which an input grayscale of the input image data is scaled based on a scaling ratio corresponding to the age data, and a compensator 230 determining a grayscale compensation value corresponding to the age data and the scaled grayscale and outputting the age compensation data ACDATA by applying the grayscale compensation value to the input image data.

In an embodiment, the image sticking compensator 200 may be implemented as a separate application processor (AP). In another embodiment, the image sticking compensator 200 may be included in the timing controller 500. In still another embodiment, the image sticking compensator 200 may be included in the data driver 400.

In an embodiment, the accumulated data may be stored in an external flash memory 10. In another embodiment, the accumulated data may be stored in a memory provided in the image sticking compensator 200.

The compensator may determine the compensation value using a lookup table method or a compensation grayscale calculation function.

In an embodiment, the compensator may include a memory 232 including a plurality of lookup tables in which a plurality of preset age values corresponding to the age data and compensation values corresponding respective display grayscales that may be implemented by the display panel are set, a compensation value determiner 234 determining the grayscale compensation value corresponding to the age data and the scaled grayscale from the lookup tables, and a compensation data output unit 236 outputting the age compensation data ACDATA by applying the grayscale compensation value to the scaled grayscale data. In this case, since the compensation value is determined through the lookup table, an operation load may be reduced and a compensation value determination logic may be simplified.

The scan driver 300 may provide scan signals to the pixels PX of the display panel 100 through the scan lines SL1 to SLn. The scan driver 300 may provide the scan signals to the display panel 100 in response to a first control signal CON1 received from the timing controller 500.

The data driver 400 may provide data signals corresponding to the age compensation data ACDATA to the pixels PX of the display panel 100 through the data lines DL1 to DLm. The data driver 400 may provide the data signals to the display panel 100 in response to a second control signal CON2 received from the timing controller 500. In an embodiment, the data driver 400 may include a gamma corrector (or a gamma voltage generator) converting the age compensation data ACDATA into voltages corresponding to the data signals. The age compensation data ACDATA of a grayscale domain may be converted into a data voltage of a voltage domain by the gamma corrector. In an embodiment, the gamma corrector may be disposed separately from the data driver. For example, the gamma corrector may receive scaled input grayscale data from the grayscale scaler and convert the scaled input grayscale data into a grayscale voltage of the voltage domain. The compensator may provide a compensation grayscale voltage of the voltage domain to the data driver 400 by adding a compensation value to the grayscale voltage of the voltage domain.

The timing controller 500 may receive the input image data IDATA from an external graphics source or the like and may control driving of the scan driver 300 and the data driver 400. The timing controller 500 may generate the first and second control signals CONT1 and CONT2 and provide the first and second control signals CONT1 and CON2 to the scan driver 300 and the data driver 400 to control the scan driver 300 and the data driver 400. In an embodiment, the timing controller 500 may further control driving of the image sticking compensator 200 in addition to the scan driver 300 and the data driver 400.

The plurality of pixels PX may receive driving voltages from the power voltage generator 600. In an embodiment, the driving voltages may include a first power voltage ELVDD (for example, a high potential of pixel voltage) and a second power voltage ELVSS (for example, a low potential of pixel voltage). However, this is an example, and the power voltage generator 600 may generate driving voltages for driving other components included in the display device 1000 in addition to the first power voltage ELVDD and the second power voltage ELVSS.

The timing controller 500 may control the power voltage generator 600 based on a third control signal CON3. Specifically, the timing controller 500 may determine to change the driving voltage as needed during an operation of the display device 1000. That is, the third control signal CON3 may be a voltage control signal. As an example, the timing controller 500 may determine to change the first power voltage ELVDD supplied to the pixel PX. In this case, the timing controller 500 may transmit the third control signal CON3 for controlling the power voltage generator 600 to change the first power voltage ELVDD to the power voltage generator 600. The power voltage generator 600 may change the first power voltage ELVDD supplied to the pixel PX in response to the received third control signal CON3.

Figure 2:
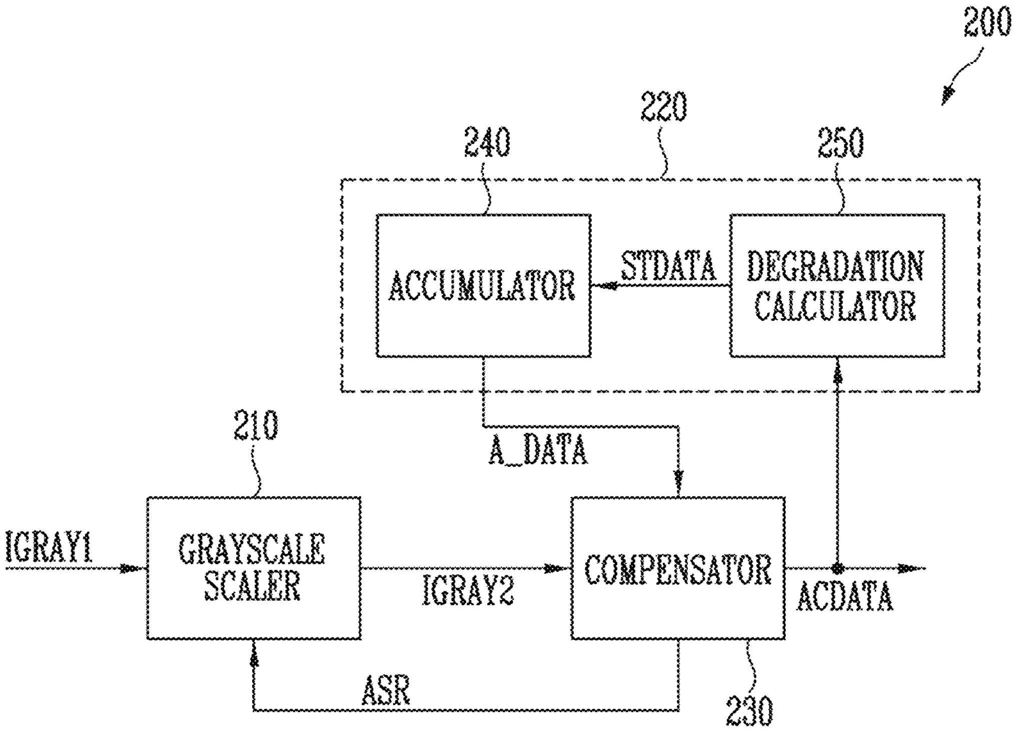
FIG. 2 is a block diagram illustrating an exemplary embodiment of an image sticking compensator of FIG. 1.
Figure 3:
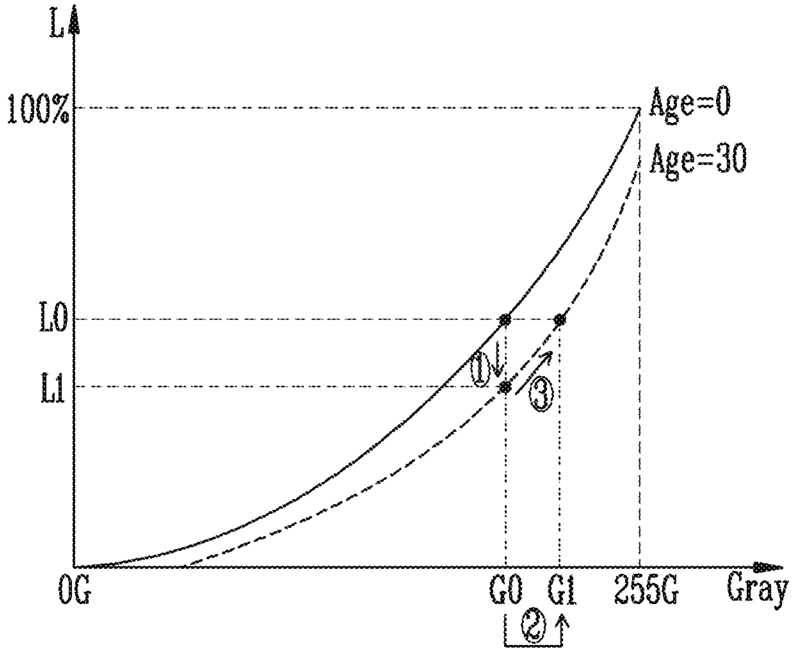
FIG. 3 is a graph illustrating an operation of the image sticking compensator of FIG. 2.
Figure 4:
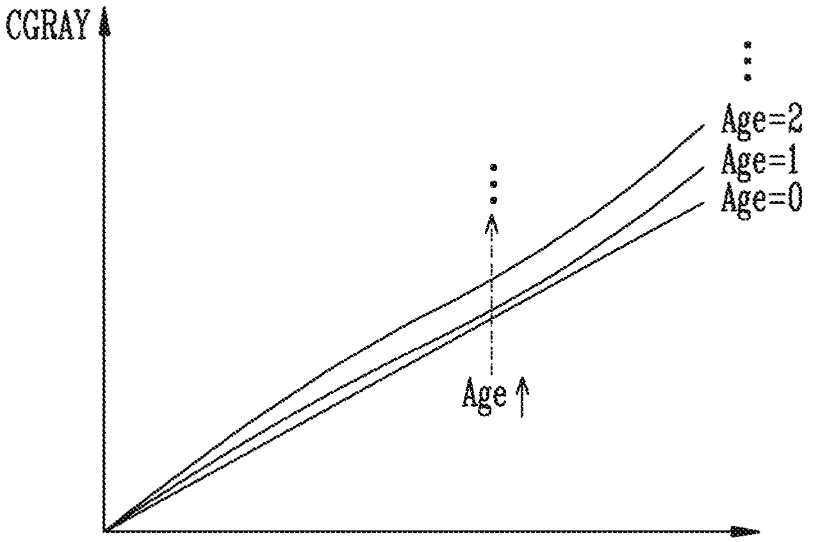
FIG. 4 is a graph illustrating an example of a relationship between an input grayscale and an output grayscale according to degradation accumulation.

FIG. 2 is a block diagram illustrating an exemplary embodiment of the image sticking compensator of FIG. 1. FIG. 3 is a graph illustrating an operation of the image sticking compensator of FIG. 2. FIG. 4 is a graph illustrating an example of a relationship between an input grayscale and an output grayscale according to degradation accumulation.

Referring to FIGS. 2 and 3, the image sticking compensator 200 may include a grayscale scaler 210, an age data calculator 220, and a compensator 230. The image sticking compensator 200 may compensate for image data (or input grayscale data) to prevent permanent image sticking due to degradation accumulation.

FIG. 3 shows a relationship between a grayscale and a luminance according to degradation or age accumulation. As shown in FIG. 3, initially (that is, Age=0), when an input grayscale IGRAY1 corresponding to a first grayscale G0 is input, the pixel may emit light at a first luminance L0 corresponding to the input grayscale IGRAY1. When degradation of the pixel progresses (for example, a graph moves from Age=0 to Age=30), a display luminance corresponding to the first grayscale G0 may decrease to a second luminance L1 (①). The image sticking compensator 200 may compensate for the input grayscale to a second grayscale G1 level (②). By inputting the compensated second grayscale G1, the pixel may emit light at the target first luminance L0 (③).

The grayscale scaler 210 may generate a scaled grayscale IGRAY2 in which the input grayscale IGRAY1 is scaled based on a scaling ratio ASR corresponding to age data A_DATA. As degradation data STDATA is accumulated, the image sticking compensator 200 compensates for the input grayscale IGRAY1 to a value greater than the input grayscale in order to compensate the image displayed on the display panel 100. However, there is a limit to a grayscale compensation value that may be compensated by the image sticking compensator 200. Therefore, in a case of a high grayscale, when predetermined degradation data STDATA is accumulated, compensation may not be performed beyond a specific grayscale and becomes saturated. Therefore, by the grayscale scaler 210 performing downscaling of the input grayscale IGRAY1 according to a degradation accumulation amount, the compensator 230 may calculate an optimal compensation value with respect to the entire grayscale area without saturation of the compensation value. In an embodiment, the grayscale scaler 210 may receive the scaling ratio ASR corresponding to the age data A_DATA from the compensator 230. For example, the compensator 230 may include a lookup table in which a plurality of scaling ratios ASR are set according to the age data A_DATA. In an embodiment, the grayscaler 210 may provide a scaled grayscale IGRAY2 to the compensator 230. However, the grayscaler 210 is an optional component, and the disclosure is not limited thereto. For example, the image sticking compensator of the display device according to an embodiment of the disclosure may not include a grayscale scaler. In this case, the compensator 230 may generate the age compensation data ACDATA based on the input grayscale IGRAY1 and the age data A_DATA.

The compensator 230 may generate the age compensation data ACDATA based on the scaled grayscale IGRAY2 and the age data A_DATA. The compensator 230 may determine a grayscale compensation value corresponding to the age data A_DATA and the scaled grayscale IGRAY2 scaled by the grayscale scaler 210. The compensator 230 may output the age compensation data ACDATA by applying the grayscale compensation value to the scaled grayscale IGRAY2.

In an embodiment, the compensator 230 may not collectively calculate the compensation value based on the age data A_DATA, and calculate the grayscale compensation value individually for each grayscale correspondingly to grayscales displayed by each pixel. The compensator 230 may calculate the grayscale compensation value using a lookup table method or a function operation method. Since emission efficiency and a degradation amount are different for each display grayscale, it is desirable to apply different compensation values according to the display grayscale. The compensator 230 may determine the optimal compensation value by considering both an accumulated degradation amount and a grayscale to be displayed in a current frame.

An exemplary configuration and operation of the compensator 230 is described in detail with reference to FIG. 5.

Meanwhile, the grayscaler 210 is an optional component, and the disclosure is not limited thereto. For example, the image sticking compensator 200 of the display device according to an embodiment of the disclosure may not include a grayscale scaler. In this case, the compensator 230 may generate the age compensation data ACDATA based on the input grayscale IGRAY1 and the age data A_DATA.

The age data calculator 220 may calculate degradation data based on the age compensation data ACDATA and accumulate and record the calculated degradation data. Meanwhile, the age data calculator 220 may generate the age data A_DATA based on the accumulated degradation data.

In an embodiment, the age data calculator 220 may include an accumulator 240 and a degradation calculator 250.

The degradation calculator 250 may calculate the degradation data STDATA of one frame (for example, the current frame) based on the age compensation data ACDATA output from the compensator 230. As described above with reference to FIG. 1, the data driver 400 may convert the age compensation data ACDATA into a voltage corresponding to the data signal and transmit the voltage to a corresponding pixel through a corresponding data line. Therefore, the age compensation data ACDATA may include information corresponding to a luminance of light generated by a light emitting element of the corresponding pixel. Therefore, the degradation calculator 250 may calculate the degradation data STDATA of the corresponding pixel in the current frame based on luminance information included in the age compensation data ACDATA. As an exemplary embodiment, the degradation calculator 250 may calculate the degradation data STDATA in the following Equation 1.

$$STDATA = \text{ROUND}\{K \times (LR)^{LAC}, 0\} \qquad \text{[Equation 1]}$$

In Equation 1 above, the ROUND (x,0) function may be a function that rounds off a decimal place of an input value x. Meanwhile, in Equation 1, K may be a predetermined coefficient. As an example, K may be a positive real number. LAC may be a luminance acceleration coefficient that indicates a degree to which a luminance of the light generated by the light emitting element affects degradation of the light emitting element. The luminance acceleration coefficient (LAC) may be determined according to a characteristic of the light emitting element and may be experimentally determined. In addition, in Equation 1, LR may indicate a luminance ratio of the light emitted by the light emitting element of the pixel by the input grayscale. As an example, the luminance ratio (LR) may be calculated in the following Equation 2.

$$LR = \left(\frac{ACDATA}{255}\right)^{\gamma} \qquad \text{[Equation 2]}$$

In Equation 2, ACDATA is the age compensation data output by the compensator 230, and $\gamma$ indicates a gamma value. The age compensation data ACDATA may indicate a grayscale value belonging to a range of 0 to 255. Therefore, a value obtained by multiplying the gamma value $\gamma$ multiplier to a grayscale ratio which is a ratio obtained by dividing the age compensation data ACDATA by 255 as the luminance ratio (LR). A representative gamma value ($\gamma$) may be 2.2.

As an example, when the coefficient K value is 1024, the luminance acceleration coefficient (LAC) is 1.6, the age compensation data ACDATA is 60, and the gamma value ($\gamma$) is 2.2, the degradation data STDATA may be calculated in the following Equation 3.

$$STDATA = \text{ROUND}\left\{1024 \times \left(\left(\frac{60}{255}\right)^{2.2}\right)^{1.6}, 0\right\} = 6 \qquad \text{[Equation 3]}$$

Referring to Equations 1 to 3, it may be seen that according to the embodiment described above, light emitted by the pixel in a specific frame is expressed as a function for the input grayscale, and this is reflected as the degradation data.

In addition, in Equations 1 and 3, ROUND (x, 0), which is the function that rounds off the decimal place of the input value x, is used to calculate the degradation data STDATA, but this is an example, and the disclosure is not limited thereto. In order to calculate the degradation data more accurately, ROUND (x, 2) which is a function that rounds off the input value x at 3 decimal places.

In an embodiment shown in FIG. 2, the age data calculator 220 calculates the degradation data STDATA of one frame (for example, the current frame) based on the age compensation data ACDATA output from the compensator 230. However, the disclosure is not limited thereto, and the degradation calculator 250 included in the age data calculator 220 may calculate the degradation weight based on the input image data IDATA and calculate the degradation data STDATA for one frame. According to an embodiment, the degradation calculator included in the age data calculator 220 may calculate the degradation weight based on a panel condition or the like. In an embodiment, the degradation weight may be calculated based on at least one of a position of the corresponding pixel in the display panel, a size of the input grayscale, a current temperature of the display panel, and an emission duty and an emission frequency of the corresponding pixel.

The accumulator 240 may accumulate the degradation data STDATA to generate the age data A_DATA in which the degradation data STDATA is accumulated. The age data A_DATA may include age information (that is, degradation information) for each pixel. As shown in FIG. 4, as the degradation data SDATA is accumulated, an amount of degradation may increase and count of the age data A_DATA may increase (for example, increase in an order from AGE=0 to AGE=2). Therefore, as degradation of the pixel progresses, a size of a correction grayscale CGRAY (for example, a grayscale compensation value CGRAY of the age compensation data) for displaying a predetermined input grayscale IGRAY is required to be increased. The accumulator 240 may update the age data A_DATA by accumulating the degradation data STDATA for each frame. In other words, the grayscale compensation value CGRAY may correspond to a compensated grayscale to display a predetermined input grayscale IGRAY at a specific age value corresponding to the age data A_DATA. The accumulator 240 may provide the age data A_DATA to the compensator 230.

Figure 5:
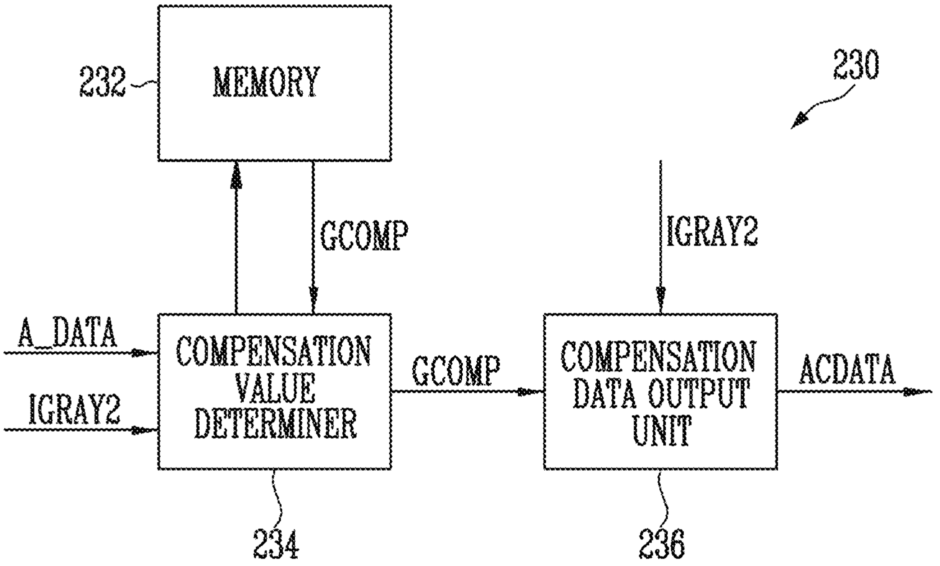
FIG. 5 is a block diagram illustrating an exemplary embodiment of a compensator of FIG. 2.

FIG. 5 is a block diagram illustrating an exemplary embodiment of the compensator of FIG. 2.

Referring to FIG. 5, the compensator 230 of the image sticking compensator 200 may include a memory 232, a compensation value determiner 234, and a compensation data output unit 236. In an embodiment, the compensator 230 may determine a grayscale compensation value GCOMP using a lookup table.

The memory 232 may include at least one or more lookup tables in which a plurality of preset age values corresponding to the age data and compensation values corresponding to respective display grayscales that may be implemented by the display panel are set. The at least one lookup table may include compensation values simultaneously corresponding to each age value and each grayscale. The memory 232 may include a static random access memory (SRAM) or a dynamic random access memory (DRAM) for storing the lookup tables.

The compensation value determiner 234 may determine the grayscale compensation value GCOMP corresponding to the age data A_DATA and the scaled grayscale IGRAY2 from the lookup tables. In an embodiment, the compensation value determiner 234 may determine the grayscale compensation value GCOMP corresponding to the age data A_DATA and the scaled grayscale IGRAY2 from the above-described lookup table.

The compensation data calculator 236 may apply the grayscale compensation value GCOMP to the scaled grayscale IGRAY2 to output the age compensation data ACDATA. Here, the age compensation data ACDATA may have a digital form defined in the grayscale domain. The age compensation data may be converted into an analog form defined in the voltage domain to be provided to the display panel through a separately provided gamma corrector.

Figure 6:
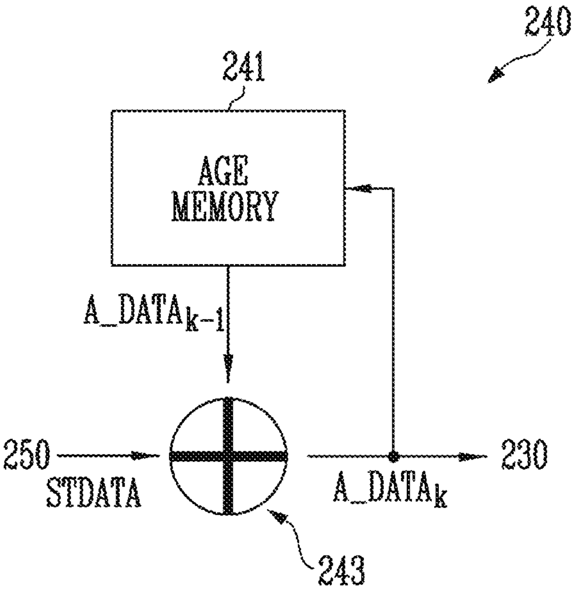
FIG. 6 is a block diagram illustrating an exemplary embodiment of the accumulator of FIG. 2.

FIG. 6 is a block diagram illustrating an exemplary embodiment of the accumulator of FIG. 2.

Referring to FIG. 6, the accumulator 240 may include an age memory 241 and an adder 243. The age memory 241 may update the age data A_DATA every frame. For example, when input image data IDATA corresponds to a current frame, for example, k-th frame, the age memory 241 may store age data $A\_DATA_{K-1}$ of a previous frame, (k−1)-th frame. The age memory 241 may provide the age data $A\_DATA_{K-1}$ of the previous frame, (k−1)-th frame, to the adder 243.

The adder 243 may calculate age data $A\_DATA_K$ of a current frame, k-th frame, by adding the immediately previous age data $A\_DATA_{K-1}$ and the degradation data STDATA. The calculated current age data $A\_DATA_K$ may be transmitted to the compensator 230 as the age data A_DATA. Meanwhile, the calculated current age data $A\_DATA_K$ may be stored in the age memory 241 and may replace the immediately previous age data $A\_DATA_{K-1}$. In such a method, the accumulator 240 may calculate the age data A_DATA by accumulating the degradation data STDATA calculated for each frame.

Although FIG. 6 shows an embodiment in which the age memory 241 is included in the accumulator 240, the disclosure is not limited thereto. The age memory 241 may be implemented as a memory external to the accumulator 240, for example, as the flash memory 10 shown in FIG. 1.

According to the embodiment described with reference to FIGS. 1 to 6, the age data calculator 220 of the image sticking compensator 200 calculates the age data A_DATA based on the age compensation data ACDATA. This is because a data voltage Vdata to be transmitted to the data line of the display panel is directly determined by the age compensation data ACDATA of the digital form defined in the grayscale domain, and the luminance of the light generated by the light emitting element of the pixel is determined according to the determined data voltage. However, the luminance of the light generated by the light emitting element may be affected not only by the data voltage transmitted from the data line but also by the driving voltage, and this may affect the age of the light emitting element. For example, as described above with reference to FIG. 1, under control of the timing controller 500, the power voltage generator 600 may change the first power voltage ELVDD supplied to the pixel PX.

According to the embodiment shown in FIGS. 1 to 6, the age data calculator 220 does not consider a change of the driving voltage supplied to the pixel, for example, the first power voltage ELVDD, when calculating the age data A_DATA, and thus does not accurately reflect a change in actual age of the light emitting element. This causes a problem in which image sticking compensation for each pixel is inaccurately performed. This is described in more detail with reference to FIGS. 7 and 8.

Figure 7:
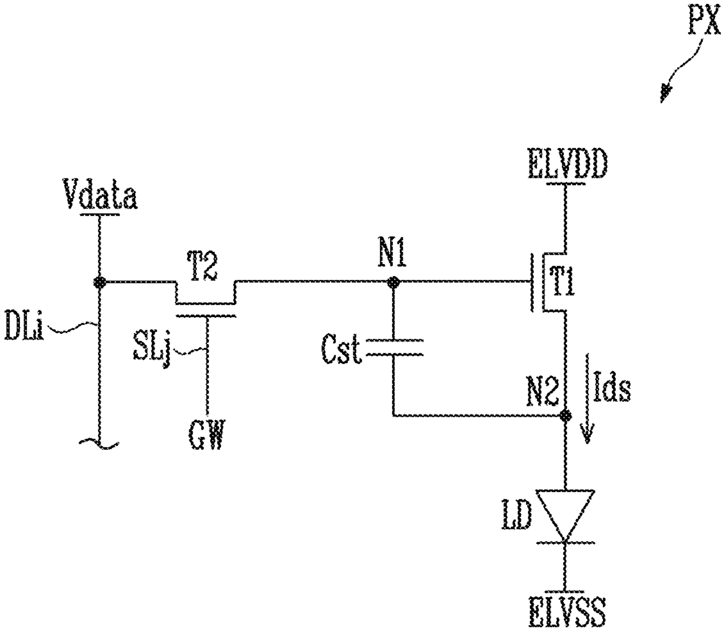
FIG. 7 is a block diagram illustrating an exemplary embodiment of a pixel of FIG. 1.
Figure 8:
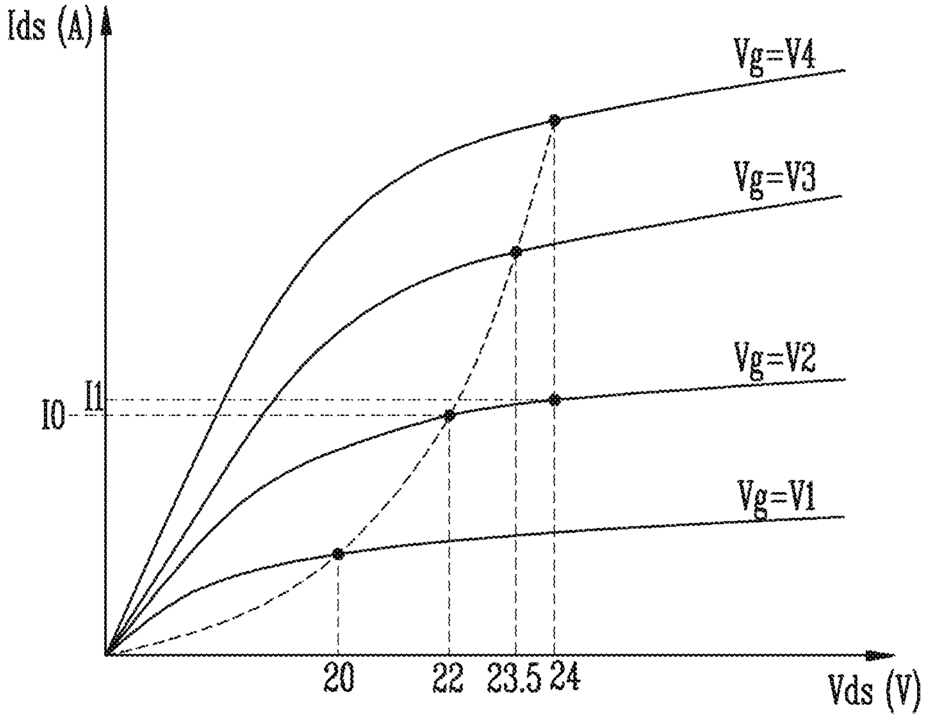
FIG. 8 is a graph illustrating a drain-source current change according to a drain-source voltage change of a first transistor.

FIG. 7 is a block diagram illustrating an exemplary embodiment of the pixel of FIG. 1. FIG. 8 is a graph illustrating a drain-source current change according to a drain-source voltage change of a first transistor.

The pixel PX of FIG. 7 is a pixel corresponding to an i-th column and a j-th row of the display panel 100. In addition, FIG. 7 exemplarily shows a pixel PX of a simple structure. However, the structure of the pixel PX shown in FIG. 7 is intended to describe effect of a change of the first power voltage ELVDD on the age of the light emitting element LD, and the disclosure is not limited thereto. The disclosure may include various other structures in addition to the pixel structure shown in FIG. 7.

Referring to FIG. 7, the pixel PX includes a first transistor T1, a second transistor T2, a storage capacitor Cst, and a light emitting element LD. The first transistor T1, that is, a driving transistor, has a gate electrode connected to a first node N1, and is connected between the first power voltage ELVDD and a second node N2. The second transistor T2 has a gate electrode connected to a j-th scan line SLj, and is connected between an i-th data line DLi and the first node N1. The second transistor T2 is turned on in response to a scan signal GW supplied to the j-th scan line SLj, and thus may transmit the data voltage Vdata supplied from the i-th data line to the first node N1.

The storage capacitor is connected between the first node N1 and the second node N2. The light emitting element LD may be connected between the second node N2 and the second power voltage ELVSS. For example, the light emitting element LD may be connected in a forward direction between the second node N2 and the second power voltage ELVSS.

When a driving current is supplied from the first transistor T1, that is, a drain-source current Ids of the first transistor is supplied, the light emitting element LD may emit light at a luminance corresponding to the driving current. In a state in which the first power voltage ELVDD and the second power voltage ELVSS are fixed, the driving current is determined according to a gate voltage of the first transistor T1, that is, a voltage of the first node N1. In addition, the voltage of the first node N1 is determined by the data voltage Vdata supplied through the i-th data line DLi. Meanwhile, as described above, the data voltage Vdata may be determined by the age compensation data ACDATA of the digital form defined in the grayscale domain. That is, in the state in which the first power voltage ELVDD and the second power voltage ELVSS are fixed, the driving current flowing through the light emitting element LD, that is, the drain-source current Ids of the first transistor, is determined by the age compensation data ACDATA.

However, when the first power voltage ELVDD changes, the drain-source current Ids of the first transistor T1, that is, the driving current, may change according to the change of the first power voltage ELVDD. FIG. 8 shows the drain-source current Ids according to the change in a drain-source voltage Vds of the first transistor T1 when the gate voltages of the first transistor T1 are V1, V2, V3, and V4, respectively. As the gate voltage increases, the driving current increases, and thus the luminance of the light generated by the light emitting element LD also increases.

Referring to FIG. 8, a saturation area of the first transistor T1 is also shown. In FIG. 8, a curve shown in a form of a dotted line indicates the drain-source voltage for the first transistor T1 to operate in the saturation area with respect to each gate voltage. For example, when the gate voltage is V1, the first transistor T1 is saturated in a range in which the drain-source voltage Vds is 20V or higher, when the gate voltage is V2, the first transistor T1 is saturated in a range in which the drain-source voltage Vds is 22V or higher, when the gate voltage is V3, the first transistor T1 is saturated in a range in which the drain-source voltage Vds is 23.5V or higher, and when the gate voltage is V4, the first transistor T1 is saturated in a range in which the drain-source voltage Vds is 24V or higher.

The first transistor T1 of the pixel PX may be designed to operate in the saturation area. However, even in this case, the driving current, that is, the drain-source current Ids of the first transistor T1 may change somewhat by the change in the drain-source voltage Vds of the first transistor T1. In an example of FIG. 8, in a case where a gate voltage Vg of the first transistor T1 is V2, when the drain-source voltage Vds increases from 22V to 24, the drain-source current Ids increases from I0 to I1.

That is, when the first power voltage ELVDD supplied to the pixel PX changes, the drain-source voltage Vds of the first transistor T1 may change. Accordingly, the driving current supplied to the light emitting element LD also changes, and this affects the age of the light emitting element LD.

When the driving voltage supplied to the pixel, for example, the first power voltage ELVDD changes, the display device according to an embodiment of the disclosure reflects this in calculating the age data A_DATA of the corresponding pixel. That is, since the age data A_DATA for image sticking compensation is generated based on the driving voltage of the pixel, an actual age change of the light emitting element in the pixel may be accurately reflected.

Figure 9:
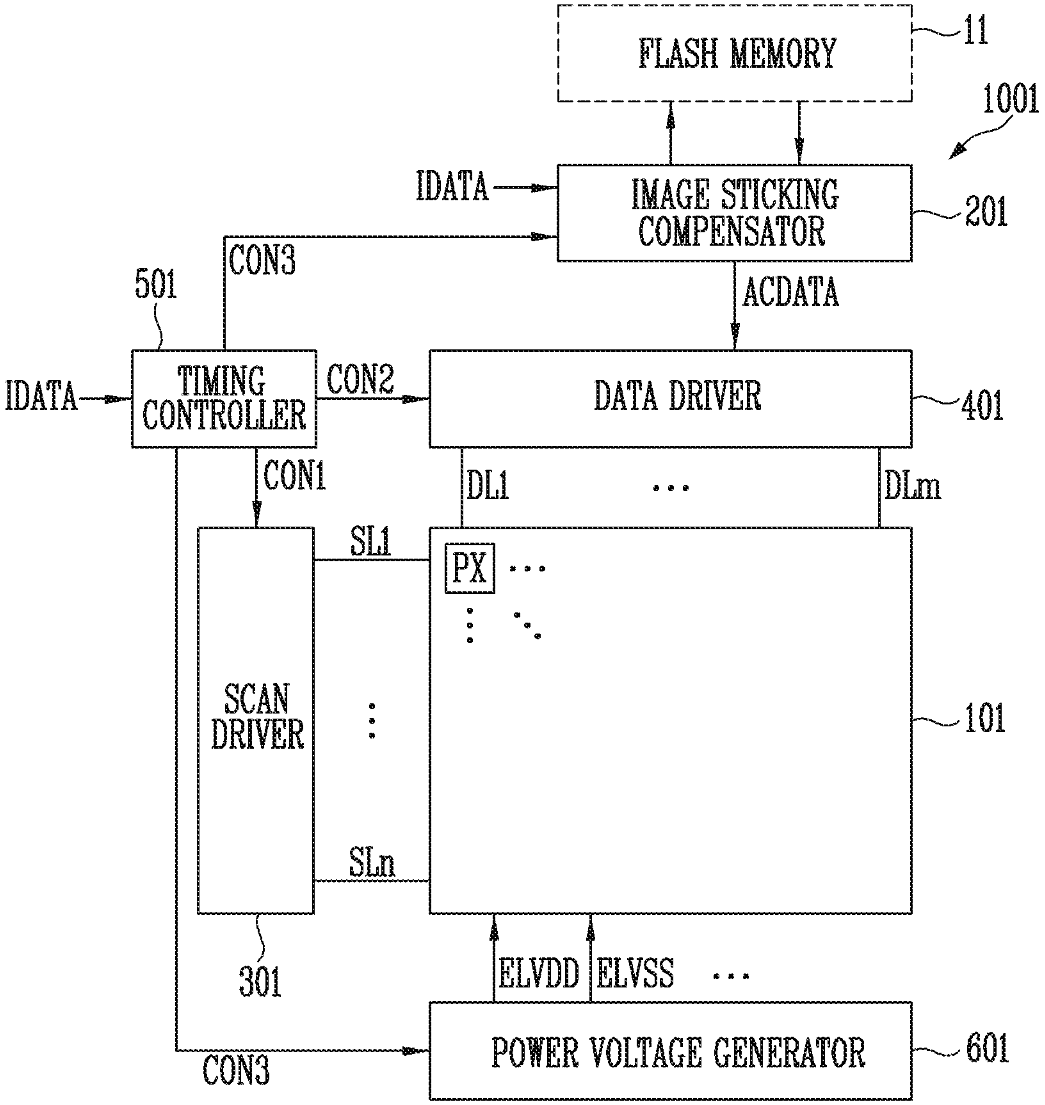
FIG. 9 is a block diagram illustrating a display device according to another embodiment of the disclosure.

FIG. 9 is a block diagram illustrating a display device according to another embodiment of the disclosure.

Referring to FIG. 9, the display device 1001 may include a display panel 101, an image sticking compensator 201, a scan driver 301, a data driver 401, a timing controller 501, and a power voltage generator 601. Among the components included in the display device 1001 of FIG. 9, the display panel 101, the scan driver 301, the data driver 401, and the power voltage generator 601 may be components substantially the same as the display panel 100, the scan driver 300, the data driver 400, and the power voltage generator 600 of FIG. 1, respectively. Therefore, an overlapping description of these is omitted.

The timing controller 501 included in the display device 1001 of FIG. 9 may control the power voltage generator 601 based on the third control signal CON3. As described above, the timing controller 501 may change the first power voltage ELVDD supplied to the pixel PX, and transmit the third control signal CON3 for controlling the power voltage generator 601 to change the first power voltage ELVDD to the power voltage generator 601. The power voltage generator 601 may change the first power voltage ELVDD supplied to the pixel PX in response to the received third control signal CON3.

Meanwhile, the timing controller 601 may transmit the third control signal CON3 for changing the first power voltage ELVDD to the image sticking compensator 201. The third control signal CON3 may include information indicating the changed first power voltage ELVDD.

The image sticking compensator 201 may calculate the age data A_DATA based on the changed first power voltage ELVDD, convert the input image data IDATA based on the calculated age data A_DATA, and output the age compensation data ACDATA.

As described above, when the driving voltage supplied to the pixel, for example, the first power voltage ELVDD changes, the display device 1001 according to an embodiment of the disclosure reflects this in calculating the age data A_DATA of the pixel. That is, since the age data A_DATA for image sticking compensation is generated based on the driving voltage of the pixel, an actual age change of the light emitting element in the pixel may be accurately reflected.

Figure 10:
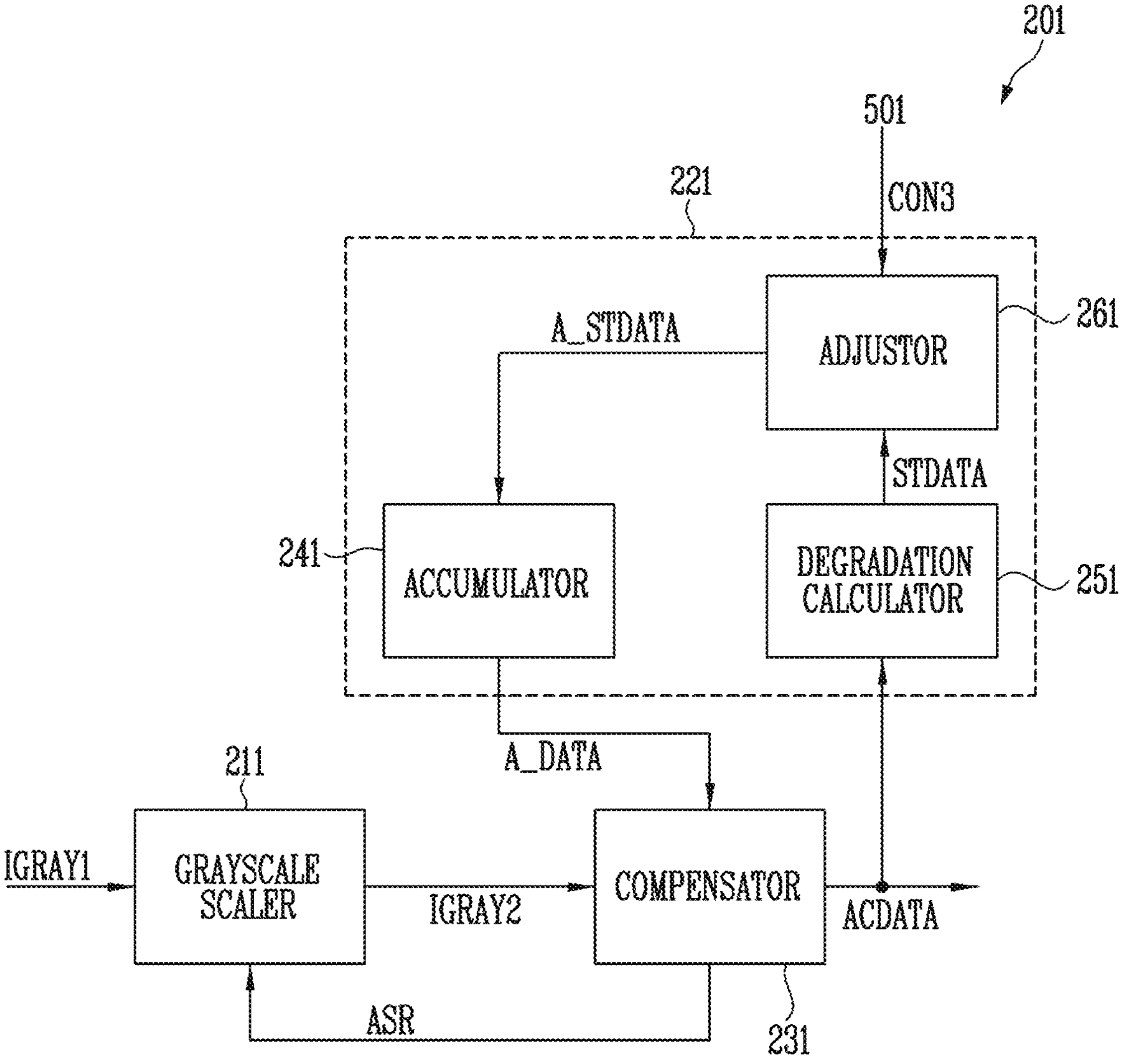
FIG. 10 is a block diagram illustrating an exemplary embodiment of an image sticking compensator of FIG. 9.

FIG. 10 is a block diagram illustrating an exemplary embodiment of the image sticking compensator of FIG. 9. Referring to FIG. 10, the image sticking compensator 201 may include a grayscale scaler 211, an age data calculator 221, and a compensator 231. The grayscale scaler 211 and the compensator 231 shown in FIG. 10 may be substantially the same components as the grayscale scaler 211 and the compensator 231 shown in FIG. 2, respectively. Therefore, an overlapping description of these is omitted.

The age data calculator 221 may calculate the degradation data STDATA based on the age compensation data ACDATA. The age data calculator 221 may also adjust the degradation data STDATA based on the third control signal CON3 to generate adjusted degradation data A_STDATA. Meanwhile, the age data calculator 221 may accumulate and record the adjusted degradation data A_STDATA and generate the age data A_DATA based on the accumulated adjusted degradation data.

In an embodiment, the age data calculator 221 may include an accumulator 241, a degradation calculator 251, and an adjustor 261. The degradation calculator 251 of FIG. 10 may be substantially the same component as the degradation calculator 250 of FIG. 2. Therefore, an overlapping description of the degradation calculator 251 is omitted.

The adjustor 261 may receive the degradation data STDATA from the degradation calculator 251 and receive the third control signal CON3 from the timing controller 501. As described above, the third control signal CON3 may include information on the first driving voltage ELVDD supplied to the pixel. The adjuster 261 may adjust the degradation data STDATA based on the information on the first driving voltage ELVDD and generate the adjusted degradation data A_STDATA as a result. The generated adjusted degradation data A_STDATA is transmitted to the accumulator 241. A specific embodiment of the adjustor 261 is described later with reference to FIG. 11.

The accumulator 241 of FIG. 10 may be substantially the same component as the accumulator 240 of FIG. 2, except that the accumulator 241 of FIG. 10 accumulates and stores the adjusted degradation data A_STDATA rather than the degradation data STDATA. The accumulator 241 may accumulate the adjusted degradation data A_STDATA and calculate this as the age data A_DATA in a method similar to that described with reference to FIG. 6. The age data A_DATA may be stored in an age memory inside the accumulator 241 or in another external memory. In addition, the age data A_DATA may be transmitted to the compensator 231.

Figure 11:
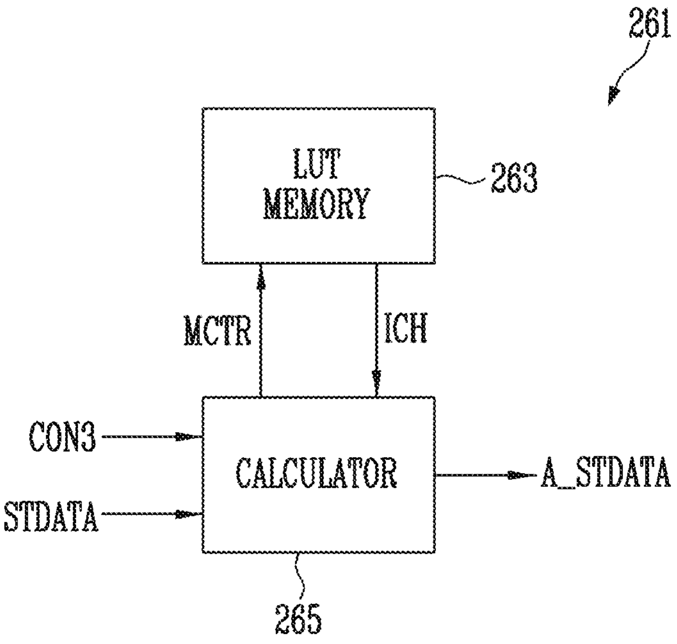
FIG. 11 is a block diagram illustrating an exemplary embodiment of an adjustor of FIG. 10.

FIG. 11 is a block diagram illustrating an exemplary embodiment of the adjustor of FIG. 10.

Referring to FIG. 11, the adjustor 261 may include a LUT memory 263 and a calculator 265.

The calculator 265 receives the third control signal CON3 and the degradation data STDATA. The calculator 265 transmits a memory control signal MCTR to the LUT memory 263 based on the third control signal CON3. As described above, the third control signal CON3 may include the information on the first driving voltage ELVDD supplied to the pixel. In addition, the memory control signal MCTR may be a signal requesting a correction value ICH corresponding to the first driving voltage ELVDD. The correction value ICH may be a value corresponding to a change of a current flowing through the light emitting element when the first driving voltage ELVDD changes.

The LUT memory 263 may transmit the correction value ICH to the calculator 265 in response to the memory control signal MCTR. To this end, the LUT memory 263 may store a lookup table indicating a relationship between the first driving voltage ELVDD and the correction values ICH corresponding to the first driving voltage ELVDD. For example, the LUT memory 263 may store a lookup table in a form shown in [Table 1] below.

TABLE 1

| ELVDD | ICH |
|---|---|
| 20 | 1 |
| 20.5 | $1 + \Delta_1$ |
| 21 | $1 + \Delta_2$ |
| 21.5 | $1 + \Delta_3$ |
| . . . | . . . |
| 24 | $1 + \Delta_x$ |

In [Table 1], all values of "Δ1" to "Δx" may be positive numbers. For example, when the first power voltage ELVDD currently supplied to the pixel is 21V, the LUT memory 263 may transmit the correction value ICH having a value of "$1+\Delta_2$" to the calculator 265. According to an embodiment, as the first power voltage ELVDD supplied to the pixel increases, a value of the correction value ICH may increase. For example, in [Table 1] above, "$\Delta_2$" may be greater than "$\Delta_1$" and "$\Delta_3$" may be greater than "$\Delta_2$". Meanwhile, among "$\Delta_1$" to "$\Delta_x$", a value of "$\Delta_x$" may be the greatest.

The calculator 265 may calculate the adjusted degradation data A_STDATA from the degradation data STDATA based on the received correction value. Specifically, the calculator 265 may calculate the adjusted degradation data A_STDATA in the following Equation 4.

$$\text{A\_STDATA} = \text{ROUND}\{STDATA \times (ICH)^{IAC}, 0\} \quad \text{[Equation 4]}$$

In Equation 4 above, IAC may be a current acceleration coefficient indicating a degree to which the change of the current flowing through the light emitting element affects the degradation of the light emitting element. The current acceleration coefficient (IAC) may be determined according to a characteristic of the light emitting element and may be experimentally determined. In an embodiment, the current acceleration coefficient (IAC) may be 1.35.

Meanwhile, in Equation 4, ROUND (x, 0) which is a function that rounds off a decimal place of the input value x is used to calculate the adjusted degradation data A_STDATA, but this is an example, and the disclosure is not limited thereto. In order to calculate the adjusted degradation data more accurately, (ROUNDx, 2) which is a function that rounds off the input value x at 3 decimal places may be used.

As an example, when the correction value ICH is 1.233 and the degradation data STDATA is 6, the adjusted degradation data calculated using Equation 4 becomes 8.

In the above-described example, the degradation calculator 251 calculates the degradation data STDATA through the ROUND (x, 0) function using Equation 1, and the calculator 265 of the adjustor 261 also calculates the adjusted degradation data A_STDATA through ROUND (x, 0) function. That is, since the ROUND (x,0) function is used twice to calculate the adjusted degradation data A_STDATA, a value of the adjusted degradation data A_STDATA may be inaccurate.

In order to improve this, the degradation calculator 251 of FIG. 10 may calculate the degradation data STDATA in the following Equation 5 instead of Equation 1.

$$STDATA = K \times (LR)^{LAC} \quad \text{[Equation 5]}$$

That is, when the degradation calculator 251 calculates the degradation data STDATA using Equation 5, the adjusted degradation data A_STDATA may be finally generated by using the ROUND (x,0) function only once.

As described above, when the driving voltage supplied to the pixel, for example, the first power voltage ELVDD changes, the display device 1001 according to an embodiment of the disclosure reflects this in calculating the age data A_DATA of the pixel. That is, since the age data A_DATA for image sticking compensation is generated based on the driving voltage of the pixel, an actual age change of the light emitting element in the pixel may be accurately reflected.

Figure 12:
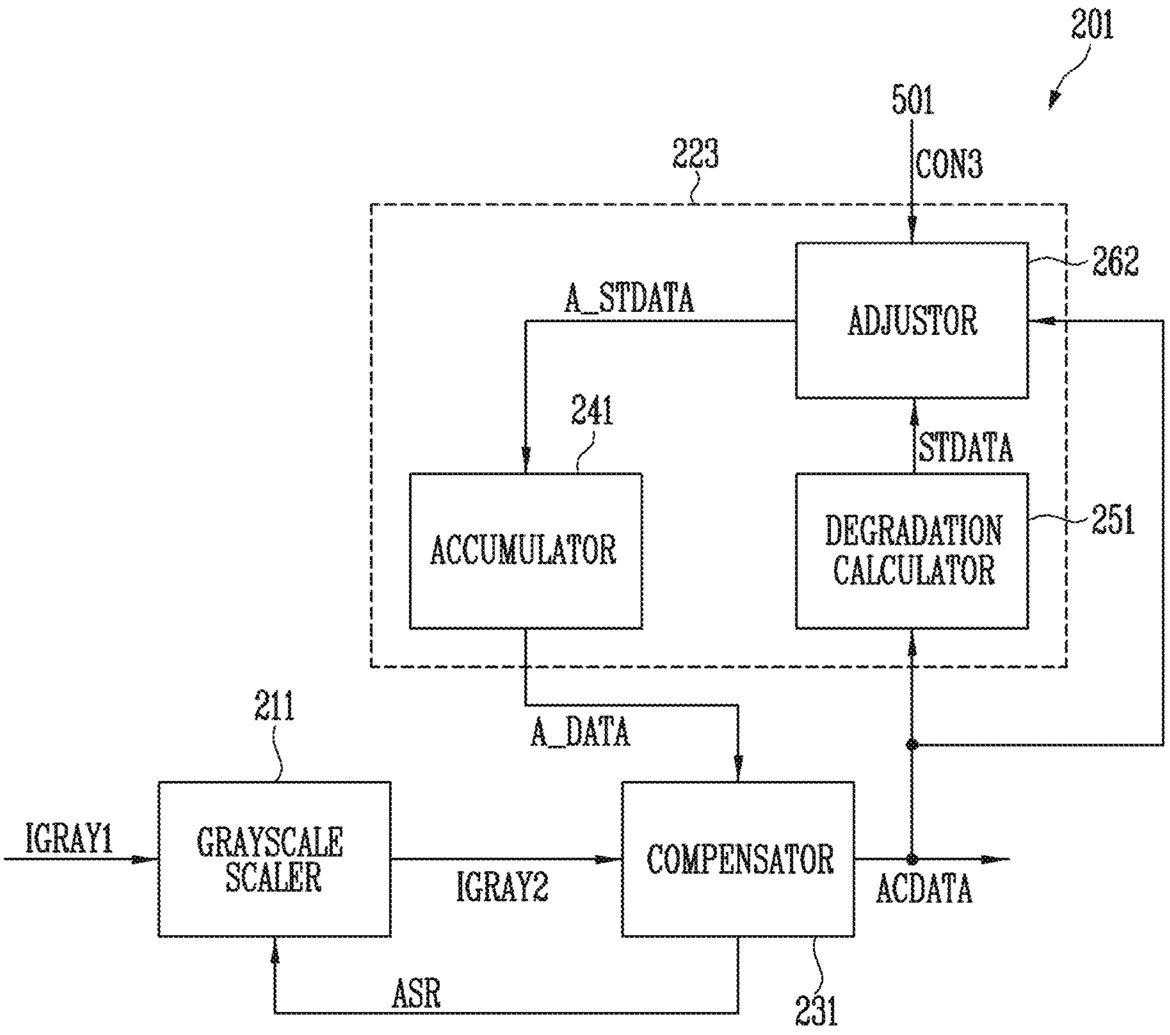
FIG. 12 is a block diagram illustrating another exemplary embodiment of the image sticking compensator of FIG. 9.

FIG. 12 is a block diagram illustrating another exemplary embodiment of the image sticking compensator of FIG. 9. Referring to FIG. 12, the image sticking compensator 201 may include a grayscale scaler 211, an age data calculator 223, and a compensator 231. The grayscale scaler 211 and the compensator 231 shown in FIG. 12 may be substantially the same components as the grayscale scaler 211 and the compensator 231 shown in FIG. 10, respectively. Therefore, an overlapping description of these is omitted.

The age data calculator 223 may calculate the degradation data STDATA based on the age compensation data ACDATA. The age data calculator 223 may include an accumulator 241, a degradation calculator 251, and an adjustor 262. The accumulator 241 and the degradation calculator 251 of FIG. 12 may be the same components as the accumulator 241 and the degradation calculator 251 of FIG. 10. Therefore, an overlapping description of these is omitted.

The adjustor 262 in FIG. 12 may receive the degradation data STDATA from the degradation calculator 251, receive the third control signal CON3 from the timing controller 501, and receive the age compensation data ACDATA from the compensator 231. The adjuster 261 may adjust the degradation data STDATA based on the information on the first driving voltage ELVDD and the age compensation data ACDATA and generate the adjusted degradation data A_STDATA as a result.

The adjustor 261 of FIG. 10 determines the correction value ICH based on the lookup table of the form shown in Table 1. Table 1 determines the correction value according to a value of the first power voltage ELVDD, regardless of a grayscale value to be displayed by the pixel. However, in reality, a driving voltage change according to the first power voltage ELVDD is related to the gate voltage of the first transistor T1, that is, the grayscale value to be displayed by the pixel. Accordingly, when the correction value ICH is determined using both of the grayscale value to be displayed by the pixel and the value of the first power voltage ELVDD, more accurate age data A_DATA may be calculated.

For example, the adjustor 262 according to FIG. 12 may calculate the adjusted degradation data A_STDATA using a lookup table of a form shown in [Table 2].

TABLE 2

| GRAY | ELVDD = 20 | ELVDD = 20.5 | ELVDD = 21 | . . . | ELVDD = 24 |
|---|---|---|---|---|---|
| 0~3 | 1 | $1 + \Delta_{11}$ | $1 + \Delta_{12}$ | . . . | $1 + \Delta_{1x}$ |
| 4~7 | 1 | $1 + \Delta_{21}$ | $1 + \Delta_{22}$ | . . . | $1 + \Delta_{2x}$ |
| 8~11 | 1 | $1 + \Delta_{31}$ | $1 + \Delta_{32}$ | . . . | $1 + \Delta_{3x}$ |
| 12~15 | 1 | $1 + \Delta_{41}$ | $1 + \Delta_{42}$ | . . . | $1 + \Delta_{4x}$ |
| 16~19 | 1 | $1 + \Delta_{51}$ | $1 + \Delta_{52}$ | . . . | $1 + \Delta_{5x}$ |
| . . . | . . . | . . . | . . . | . . . | . . . |
| 244~247 | 1 | $1 + \Delta_{p1}$ | $1 + \Delta_{p2}$ | . . . | $1 + \Delta_{px}$ |
| 248~251 | 1 | $1 + \Delta_{q1}$ | $1 + \Delta_{q2}$ | . . . | $1 + \Delta_{qx}$ |
| 252~255 | 1 | $1 + \Delta_{r1}$ | $1 + \Delta_{r2}$ | . . . | $1 + \Delta_{rx}$ |

In [Table 2], all values of "$\Delta_{11}$" to "$\Delta_{rx}$" may be positive numbers.

Referring to [Table 2], the correction value ICH may be determined based on not only the first power voltage ELVDD currently supplied to the pixel but also the age compensation data ACDATA indicating the grayscale value currently supplied to the pixel. Therefore, an actual age change of the light emitting element in the pixel may be more accurately reflected.

In this case, the adjustor 262 according to FIG. 12 may include a LUT memory and a calculator similar to the adjustor 261 of FIG. 11. The LUT memory may store the lookup table of the form shown in [Table 2]. Meanwhile, the calculator 265 transmits the memory control signal MCTR to the LUT memory 263 based on the third control signal CON3 and the age compensation data ACDATA. The memory control signal MCTR may be a signal requesting the correction value ICH corresponding to the grayscale value of the first driving voltage ELVDD and the age compensation data ACDATA. Meanwhile, the correction value ICH may be a value corresponding to the change of the current flowing through the light emitting element when the first driving voltage ELVDD changes when the pixel operates correspondingly to the grayscale value of the age compensation data ACDATA. The LUT memory may transmit the correction value ICH to the calculator 265 in response to the memory control signal MCTR.

As described above, as the first power voltage ELVDD supplied to the pixel increases, the value of the correction value ICH may increase. For example, in a first row of [Table 2] where grayscale values are 0 to 3, "$\Delta_{12}$" may be greater than "$\Delta_{11}$." Meanwhile, among "$\Delta_{11}$" to "$\Delta_{1x}$", a value of "$\Delta_{1x}$" may be the greatest.

In addition, under a condition of the fixed first power voltage ELVDD, as the grayscale value increases, the value of the correction value ICH may increase. For example, referring to a second column of [Table 2] where the first power voltage ELVDD is 20.5 (V), "$\Delta_{21}$" may be greater than "$\Delta_{11}$" and "$\Delta_{31}$" may be greater than "$\Delta_{21}$". Meanwhile, among "$\Delta_{11}$" to "$\Delta_{r1}$", a value of "$\Delta_{r1}$" may be the greatest.

Figure 13:
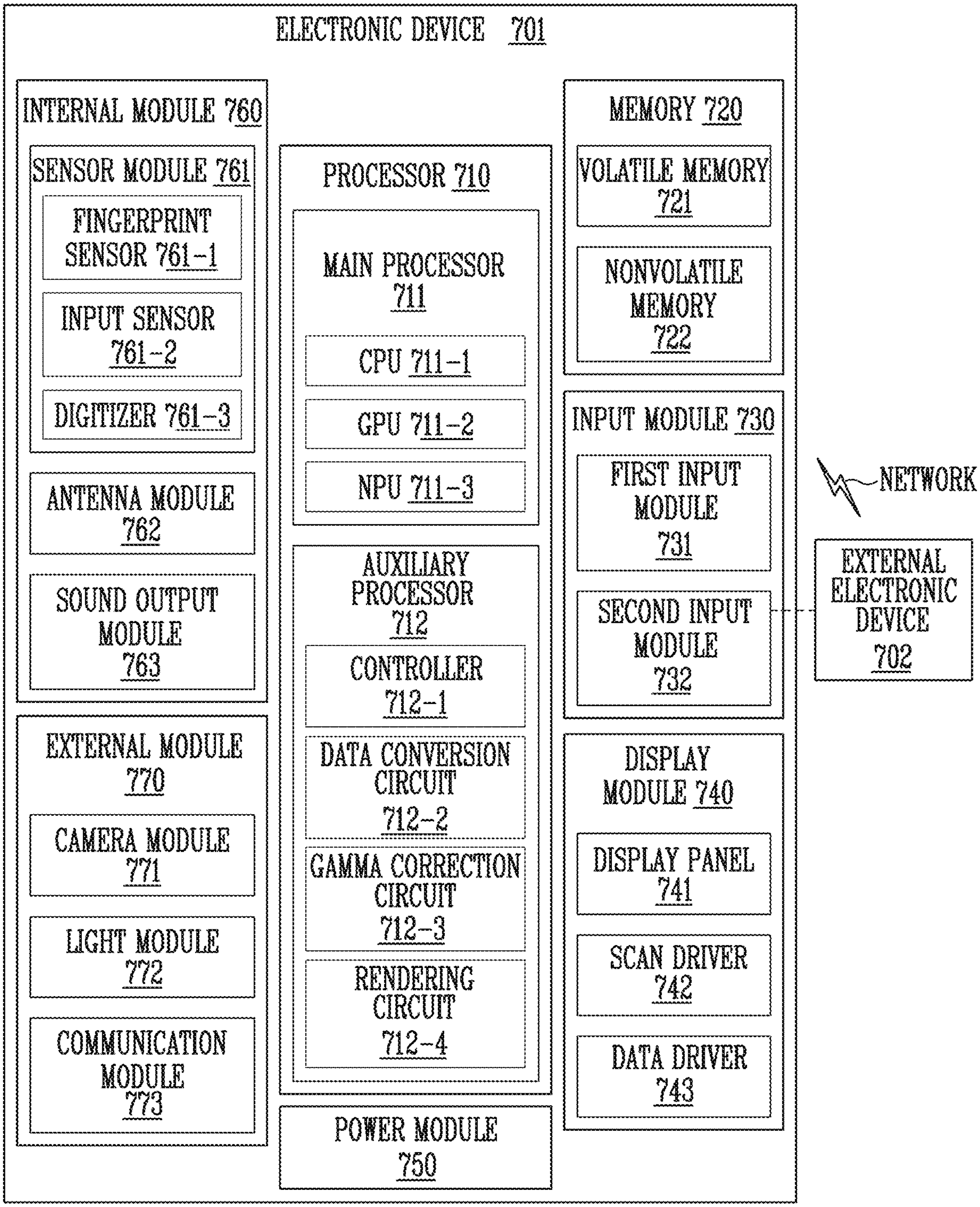
FIG. 13 is a block diagram of an electronic device according to embodiments of the disclosure.

FIG. 13 is a block diagram of an electronic device according to embodiments of the disclosure.

The electronic device 701 outputs various pieces of information through a display module 740 in an operating system. When a processor 710 executes an application stored in a memory 720, the display module 740 provides application information to a user through a display panel 741.

The processor 710 obtains an external input through an input module 730 or a sensor module 761 and executes an application corresponding to the external input. For example, when the user selects a camera icon displayed on the display panel 741, the processor 710 obtains a user input through an input sensor 761-2 and activates a camera module 771. The processor 710 transmits image data corresponding to a captured image obtained through the camera module 771 to the display module 740. The display module 740 may display an image corresponding to the captured image through the display panel 741.

As another example, when personal information authentication is executed in the display module 740, a fingerprint sensor 761-1 obtains input fingerprint information as input data. The processor 710 compares input data obtained through the fingerprint sensor 761-1 with authentication data stored in a memory 720 and executes an application according to a comparison result. The display module 740 may display information executed according to a logic of the application through the display panel 741.

As still another example, when a music streaming icon displayed on the display module 740 is selected, the processor 710 obtains a user input through the input sensor 761-2 and activates a music streaming application stored in the memory 720. When a music execution command is input in the music streaming application, the processor 710 activates a sound output module 763 to provide sound information corresponding to the music execution command to the user.

In the above, an operation of the electronic device 701 is briefly described. Hereinafter, a configuration of the electronic device 701 is described in detail. Some of configurations of the electronic device 701 to be described later may be integrated and provided as one configuration, and one configuration may be separated into two or more configurations and provided.

Referring to FIG. 13, the electronic device 701 may communicate with an external electronic device 702 through a network (for example, a short-range wireless communication network or a long-range wireless communication network). According to an embodiment, the electronic device 701 may include a processor 710, a memory 720, an input module 730, a display module 740, a power module 750, an internal module 760, and an external module 770. According to an embodiment, in the electronic device 701, at least one of the above-described components may be omitted or one or more other components may be added. According to an embodiment, some of the above-described components (for example, the sensor module 761, an antenna module 762, or the sound output module 763) may be integrated into another component (for example, the display module 740).

The processor 710 may execute software to control at least another component (for example, a hardware or software component) of the electronic device 701 connected to the processor 710, and perform various data processing or operations. According to an embodiment, as at least a portion of the data processing or operation, the processor 710 may store a command or data received from another component (for example, the input module 730, the sensor module 761, or a communication module 773) in a volatile memory 721 and process the command or the data stored in the volatile memory 721, and result data may be stored in a nonvolatile memory 722.

The processor 710 may include a main processor 711 and an auxiliary processor 712. The main processor 711 may include one or more of a central processing unit (CPU) 711-1 or an application processor (AP). The main processor 711 may further include any one or more of a graphic processing unit (GPU) 711-2, a communication processor (CP), and an image signal processor (ISP). The main processor 711 may further include a neural processing unit (NPU) 711-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 712 may include a controller 712-1. The controller 712-1 may include an interface conversion circuit and a timing control circuit. The controller 712-1 receives an image signal from the main processor 711, converts a data format of the image signal to correspond to an interface specification with the display module 740, and outputs image data. The controller 712-1 may output various control signals required for driving the display module 740.

The auxiliary processor 712 may further include a data conversion circuit 712-2, a gamma correction circuit 712-3, a rendering circuit 712-4, and the like. The data conversion circuit 712-2 may receive the image data from the controller 712-1, compensate the image data to display an image with a desired luminance according to a characteristic of the electronic device 701, a setting of the user, or the like, or convert the image data for reduction of power consumption, afterimage compensation, or the like. The gamma correction circuit 712-3 may convert the image data, a gamma reference voltage, or the like so that the image displayed on the electronic device 701 has a desired gamma characteristic. The rendering circuit 712-4 may receive the image data from the controller 712-1 and render the image data in consideration of a pixel disposition or the like of the display panel 741 applied to the electronic device 701. At least one of the data conversion circuit 712-2, the gamma correction circuit 712-3, and the rendering circuit 712-4 may be integrated into another component (for example, the main processor 711 or the controller 712-1). At least one of the data conversion circuit 712-2, the gamma correction circuit 712-3, and the rendering circuit 712-4 may be integrated into a data driver 743 to be described later.

The memory 720 may store various data used by at least one component (for example, the processor 710 or the sensor module 761) of the electronic device 701, and input data or output data for a command related thereto. The memory 720 may include at least one of the volatile memory 721 and the nonvolatile memory 722.

The input module 730 may receive a command or data to be used by a component (for example, the processor 710, the sensor module 761, or the sound output module 763) of the electronic device 701 from an outside (for example, the user or the external electronic device 702) of the electronic device 701.

The input module 730 may include a first input module 731 to which a command or data is input from the user and a second input module 732 to which a command or data is input from the external electronic device 702. The first input module 731 may include a microphone, a mouse, a keyboard, a key (for example, a button), or a pen (for example, a passive pen or an active pen). The second input module 732 may support a designated protocol capable of connecting to the external electronic device 702 by wire or wirelessly. According to an embodiment, the second input module 732 may include a high definition multimedia interface (HDMI), a universal serial bus (USB) interface, an SD card interface, or an audio interface. The second input module 732 may include a connector capable of physically connecting to the external electronic device 702, for example, an HDMI connector, a USB connector, an SD card connector, or an audio connector (for example, a headphone connector).

The display module 740 visually provides information to the user. The display module 740 may include the display panel 741, a scan driver 742, and the data driver 743. The display module 740 may further include a window, a chassis, and a bracket for protecting the display panel 741.

The display panel 741 may include a liquid crystal display panel, an organic light emitting display panel, or an inorganic light emitting display panel, and a type of the display panel 741 is not particularly limited. The display panel 741 may be a rigid type or a flexible type that may be rolled or folded. The display module 740 may further include a supporter, a bracket, a heat dissipation member, or the like that supports the display panel 741.

The scan driver 742 may be mounted on the display panel 741 as a driving chip. In addition, the scan driver 742 may be integrated in the display panel 741. For example, the scan driver 742 may include an amorphous silicon TFT gate driver circuit (ASG), a low temperature polycrystalline silicon (LTPS) TFT gate driver circuit, or an oxide semiconductor TFT gate driver circuit (OSG) built in the display panel 741. The scan driver 742 receives a control signal from the controller 712-1 and outputs scan signals to the display panel 741 in response to the control signal.

The display panel 741 may further include an emission driver. The emission driver outputs an emission control signal to the display panel 741 in response to the control signal received from the controller 712-1. The emission driver may be formed separately from the scan driver 742 or may be integrated into the scan driver 742.

The data driver 743 receives a control signal from the controller 712-1, converts image data into an analog voltage (for example, a data voltage) in response to the control signal, and then outputs the data voltages to the display panel 741.

The data driver 743 may be integrated into another component (for example, the controller 712-1). A function of the interface conversion circuit and the timing control circuit of the controller 712-1 described above may be integrated into the data driver 743.

The display module 740 may further include an emission driver, a voltage generation circuit, and the like. The voltage generation circuit may output various voltages required for driving of the display panel 741.

The power module 750 supplies power to a component of the electronic device 701. The power module 750 may include a battery that charges a power voltage. The battery may include a non-rechargeable primary cell, and a rechargeable secondary cell or fuel cell. The power module 750 may include a power management integrated circuit (PMIC). The PMIC supplies optimized power to each of the above-described module and a module to be described later. The power module 750 may include a wireless power transmission/reception member electrically connected to the battery. The wireless power transmission/reception member may include a plurality of antenna radiators of a coil form.

The electronic device 701 may further include the internal module 760 and the external module 770. The internal module 760 may include the sensor module 761, the antenna module 762, and the sound output module 763. The external module 770 may include the camera module 771, a light module 772, and the communication module 773.

The sensor module 761 may sense an input by a body of the user or an input by a pen among the first input module 731, and may generate an electrical signal or a data value corresponding to the input. The sensor module 761 may include at least one of a fingerprint sensor 761-1, an input sensor 761-2, and a digitizer 761-3.

The fingerprint sensor 761-1 may generate a data value corresponding to a fingerprint of the user. The fingerprint sensor 761-1 may include one of an optical type or capacitive type fingerprint sensor.

The input sensor 761-2 may generate a data value corresponding to coordinate information of the input by the body of the user or the pen. The input sensor 761-2 generates a capacitance change amount by the input as the data value. The input sensor 761-2 may sense an input by the passive pen or may transmit/receive data to and from the active pen.

The input sensor 761-2 may measure a biometric signal such as blood pressure, water, or body fat. For example, when the user touches a sensor layer or a sensing panel with a body part and does not move during a certain time, the input sensor 761-2 may sense the biometric signal based on a change of an electric field by the body part and output information desired by the user to the display module 740.

The digitizer 761-3 may generate a data value corresponding to coordinate information of the input by the pen. The digitizer 761-3 generates an electromagnetic change amount by the input as the data value. The digitizer 761-3 may sense the input by the passive pen or may transmit/receive data to and from the active pen.

At least one of the fingerprint sensor 761-1, the input sensor 761-2, and the digitizer 761-3 may be implemented as the sensor layer formed on the display panel 741 through a continuous process. The fingerprint sensor 761-1, the input sensor 761-2, and the digitizer 761-3 may be disposed above the display panel 741, and any one of the fingerprint sensor 761-1, the input sensor 761-2, and the digitizer 761-3, for example, the digitizer 761-3 may be disposed below the display panel 741.

At least two of the fingerprint sensor 761-1, the input sensor 761-2, and the digitizer 761-3 may be formed to be integrated into one sensing panel through the same process. When at least two of the fingerprint sensor 761-1, the input sensor 761-2, and the digitizer 761-3 are integrated into one sensing panel, the sensing panel may be disposed between the display panel 741 and a window disposed above the display panel 741. According to an embodiment, the sensing panel may be disposed on the window, and a position of the sensing panel is not particularly limited.

At least one of the fingerprint sensor 761-1, the input sensor 761-2, and the digitizer 761-3 may be embedded in the display panel 741. That is, at least one of the fingerprint sensor 761-1, the input sensor 761-2, and the digitizer 761-3 may be simultaneously formed through a process of forming elements (for example, a light emitting element, a transistor, and the like) included in the display panel 741.

In addition, the sensor module 761 may generate an electrical signal or a data value corresponding to an internal state or an external state of the electronic device 701. The sensor module 761 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 762 may include one or more antennas for transmitting a signal or power to an outside or receiving a signal or power from an outside. According to an embodiment, the communication module 773 may transmit a signal to an external electronic device or receive a signal from an external electronic device through an antenna suitable for a communication method. An antenna pattern of the antenna module 762 may be integrated into one configuration (for example, the display panel 741) of the display module 740 or the input sensor 761-2.

The sound output module 763 is a device for outputting a sound signal to an outside of the electronic device 701, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 763 may be integrated into the display module 740.

The camera module 771 may capture a still image and a moving image. According to an embodiment, the camera module 771 may include one or more lenses, an image sensor, or an image signal processor. The camera module 771 may further include an infrared camera capable of measuring presence or absence of the user, a position of the user, a gaze of the user, and the like.

The light module 772 may provide light. The light module 772 may include a light emitting diode or a xenon lamp. The light module 772 may operate in conjunction with the camera module 771 or may operate independently.

The communication module 773 may support establishment of a wired or wireless communication channel between the electronic device 701 and the external electronic device 702 and communication performance through the established communication channel. The communication module 773 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 773 may communicate with the external electronic device 702 through a short-range communication network such as Bluetooth, WiFi direct, or infrared data association (IrDA), or a long-range communication network such as a cellular network, the Internet, or a computer network (for example, LAN or WAN). The above-described various types of communication modules 773 may be implemented as a single chip or as separate chips.

The input module 730, the sensor module 761, the camera module 771, and the like may be used to control an operation of the display module 740 in conjunction with the processor 710.

The processor 710 outputs a command or data to the display module 740, the sound output module 763, the camera module 771, or the light module 772 based on input data received from the input module 730. For example, the processor 710 may generate image data in response to the input data applied through a mouse, an active pen, or the like and output the image data to the display module 740, or generate command data in response to the input data and output the command data to the camera module 771 or the light module 772. When the input data is not received from the input module 730 during a certain time, the processor 710 may switch an operation mode of the electronic device 701 to a low power mode or a sleep mode to reduce power consumed in the electronic device 701.

The processor 710 outputs a command or data to the display module 740, the sound output module 763, the camera module 771, or the light module 772 based on sensing data received from the sensor module 761. For example, the processor 710 may compare authentication data applied by the fingerprint sensor 761-1 with authentication data stored in the memory 720 and then execute an application according to a comparison result. The processor 710 may execute the command based on sensing data sensed by the input sensor 761-2 or the digitizer 761-3 or output corresponding image data to the display module 740. When the sensor module 761 includes a temperature sensor, the processor 710 may receive temperature data for a measured temperature from the sensor module 761 and further perform luminance correction or the like on the image data based on the temperature data.

The processor 710 may receive measurement data for the presence of the user, the position of the user, the gaze of the user, and the like, from the camera module 771. The processor 710 may further perform luminance correction or the like on the image data based on the measurement data. For example, the processor 710 determining the presence or absence of the user through an input from the camera module 771 may output image data of which a luminance is corrected through the data conversion circuit 712-2 or the gamma correction circuit 712-3 to the display module 740.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 710 may communicate with the display module 740 through a mutually agreed interface, for example, may use any one of the above-described communication methods, and is not limited to the above-described communication method.

The display device shown in FIG. 9 may be integrated into the electronic device 701 of FIG. 13. For example, the display panel 101, the data driver 410, and the scan driver 301 of FIG. 9 may correspond to the display panel 741, the data driver 743, and the scan driver 742 of FIG. 13, respectively.

In addition, the power voltage generator 601 of FIG. 9 may be integrated into the power module 750 of FIG. 13, and the timing controller 501 of FIG. 9 may be included in the controller 712-1 of FIG. 13. In addition, the image sticking compensator 201 of FIG. 9 may be integrated into the data conversion circuit 712-2 of FIG. 13. Meanwhile, the flash memory 11 of FIG. 9 may correspond to the nonvolatile memory 722 of FIG. 13.

The electronic device 701 according to various embodiments disclosed in this document may be of various types devices. The electronic device 701 may include, for example, at least one of a portable communication device (for example, a smartphone), a computer device, a portable multimedia device, a portable medical device, a camera, a wearable device, or a home appliance. The electronic device 701 according to an embodiment of this document is not limited to the above-described devices.

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosure.

What is claimed is:

1. A display device comprising:
- a pixel emitting light based on input image data;
- an age data calculator configured to generate age data of a light emitting element included in the pixel according to a power voltage supplied to the pixel; and
- a compensator configured to output age compensation data by determining a grayscale compensation value corresponding to an input grayscale of the input image data based on the age data and applying the grayscale compensation value to the input image data,
- wherein the age data calculator comprises a degradation calculator calculating degradation data based on the age compensation data, and
- wherein the degradation data is determined based on a luminance acceleration coefficient of the light emitting element and a luminance ratio determined by the age compensation data.

2. The display device according to claim 1, wherein the age data calculator further comprises:
- an adjustor adjusting the degradation data based on the power voltage and calculating adjusted degradation data; and
- an accumulator generating the age data by accumulating the adjusted degradation data.

3. The display device according to claim 1, wherein the degradation calculator calculates the degradation data using a formula:

$STDATA=K\times(LR)^{LAC}$, where, K is a positive real number, LAC is the luminance acceleration coefficient of the light emitting element, and LR is the luminance ratio determined by the age compensation data.

4. The display device according to claim 3, wherein the degradation calculator calculates the luminance ratio using a formula:

$$LR = \left(\frac{ACDATA}{255}\right)^{\gamma},$$

where, ACDATA is the age compensation data, and $\gamma$ is a gamma value.

5. The display device according to claim 4, wherein the adjustor comprises:

a calculator generating a memory control signal (MCTR) based on the power voltage; and a LUT memory transmitting a correction value corresponding to the power voltage to the calculator in response to the memory control signal, and wherein the calculator calculates the adjusted degradation data using the degradation data and the correction value.

6. The display device according to claim 5, wherein the LUT memory stores a lookup table including a plurality of correction values respectively corresponding to a plurality of power voltages.

7. The display device according to claim 5, wherein the calculator calculates the adjusted degradation data using a formula: $A\_STDATA=ROUND\{STDATA\times(ICH)^{IAC},0\}$ where, A_STDATA is the adjusted degradation data, ICH is the correction value, and IAC is a current acceleration coefficient of the light emitting element.

8. The display device according to claim 4, wherein the adjustor comprises:

a calculator generating a memory control signal (MCTR) based on the power voltage and the age compensation data; and a LUT memory transmitting a correction value corresponding to the power voltage to the calculator in response to the memory control signal, and wherein the calculator calculates the adjusted degradation data using the degradation data and the correction value.

9. The display device according to claim 2, further comprising:

a grayscale scaler configured to generate a scaled grayscale in which the input grayscale is scaled based on a scaling ratio corresponding to the age data in order to prevent the grayscale compensation value from being saturated due to accumulation of the degradation data.

10. The display device according to claim 9, wherein the compensator comprises:

a memory including a plurality of lookup tables in which a plurality of preset age values corresponding to the age data and compensation values respectively corresponding to display grayscales that may be implemented by a display panel are set;

a compensation value determiner determining the grayscale compensation value corresponding to the age data and the scaled grayscale using the plurality of lookup tables; and a compensation data output unit outputting the age compensation data by applying the grayscale compensation value to the scaled grayscale data.

11. A display device comprising:

a display panel including a plurality of pixels;

an image sticking compensator configured to output age compensation data based on age data and an input grayscale of input image data;

a scan driver configured to provide a plurality of scan signals to the display panel;

a data driver configured to provide a plurality of data signals corresponding to the age compensation data to the display panel;

a power voltage generator configured to generate a power voltage supplied to the pixel; and a timing controller configured to control driving of the scan driver, the data driver, and the power voltage generator, wherein the image sticking compensator comprises:

an age data calculator configured to generate the age data according to the power voltage supplied to the plurality of pixels; and a compensator configured to output the age compensation data by determining a grayscale compensation value corresponding to the input grayscale of the input image data based on the age data and applying the grayscale compensation value to the input image data, wherein the age data calculator comprises a degradation calculator calculating degradation data based on the age compensation data, and wherein the degradation data is determined based on a luminance acceleration coefficient of a light emitting element and a luminance ratio determined by the age compensation data.

12. The display device according to claim 11, wherein the timing controller generates a voltage control signal that controls the power voltage generator to change the power voltage, and wherein the age data calculator further comprises:

an adjustor adjusting the degradation data in response to the voltage control signal and calculating adjusted degradation data; and an accumulator generating the age data by accumulating the adjusted degradation data.

13. The display device according to claim 11, wherein the degradation calculator calculates the degradation data using a formula: $STDATA=K\times(LR)^{LAC}$, where, K is a positive real number, LAC is the luminance acceleration coefficient of the light emitting element, and LR is the luminance ratio determined by the age compensation data.

14. The display device according to claim 13, wherein the degradation calculator calculates the luminance ratio using a formula:

$$LR = \left(\frac{ACDATA}{255}\right)^{\gamma},$$

where, ACDATA is the age compensation data, and $\gamma$ is a gamma value.

15. The display device according to claim 14, wherein the adjustor comprises:

a calculator generating a memory control signal (MCTR) in response to the voltage control signal; and a LUT memory transmitting a correction value corresponding to the power voltage to the calculator in response to the memory control signal, and wherein the calculator calculates the adjusted degradation data using the degradation data and the correction value.

16. The display device according to claim 15, wherein the LUT memory stores a lookup table including a plurality of correction values respectively corresponding to a plurality of power voltages.

17. The display device according to claim 15, wherein the calculator calculates the adjusted degradation data using a formula: $A\_STDATA=ROUND\{STDATA\times(ICH)^{IAC},0\}$ where, A_STDATA is the adjusted degradation data, ICH is the correction value, and IAC is a current acceleration coefficient of the light emitting element.

18. The display device according to claim 14, wherein the adjustor comprises:

a calculator generating a memory control signal (MCTR) based on the voltage control signal and the age compensation data; and a LUT memory transmitting a correction value corresponding to the power voltage to the calculator, based on the memory control signal, and wherein the calculator calculates the adjusted degradation data from the degradation data based on the correction value.

19. The display device according to claim 12, further comprising:

a grayscale scaler configured to generate a grayscale in which the input grayscale is scaled based on a scaling ratio corresponding to the age data in order to prevent the grayscale compensation value from being saturated due to accumulation of the degradation data.

20. The display device according to claim 19, wherein the compensator comprises:

a memory including a plurality of lookup tables in which a plurality of preset age values corresponding to the age data and compensation values respectively corresponding to display grayscales that may be implemented by a display panel are set;

a compensation value determiner determining the grayscale compensation value corresponding to the age data and the scaled grayscale using the plurality of lookup tables; and a compensation data output unit outputting the age compensation data by applying the grayscale compensation value to the scaled grayscale data.

21. An electronic device comprising:

a display panel including a plurality of pixels;

a data conversion circuit configured to output age compensation data based on age data and an input grayscale of input image data;

a scan driver configured to provide a plurality of scan signals to the display panel;

a data driver configured to provide a plurality of data signals corresponding to the age compensation data to the display panel;

a power module configured to generate a power voltage supplied to the plurality of pixels; and a controller configured to control driving of the scan driver, the data driver, and the power module, wherein the data conversion circuit comprises:

an age data calculator configured to generate the age data according to the power voltage supplied to the plurality of pixels; and a compensator configured to output the age compensation data by determining a grayscale compensation value corresponding to the input grayscale of the input image data based on the age data and applying the grayscale compensation value to the input image data, wherein the age data calculator comprises a degradation calculator calculating degradation data based on the age compensation data, and wherein the degradation data is determined based on a luminance acceleration coefficient of a light emitting element and a luminance ratio determined by the age compensation data.

* * * * *